United States Patent
Morris et al.

(10) Patent No.: US 11,254,423 B2
(45) Date of Patent: Feb. 22, 2022

(54) DAMPING LANDING GEAR SYSTEMS FOR VTOL AIRCRAFT

(71) Applicant: Textron Innovations Inc., Providence, RI (US)

(72) Inventors: Kevin Morris, Hawkesbury (CA); Nicholas Brodeur, Beaconsfield (CA); Pascal Flynn-Robitaille, Laval (CA)

(73) Assignee: Textron Innovations Inc., Providence, RI (US)

( * ) Notice: Subject to any disclaimer, the term of this patent is extended or adjusted under 35 U.S.C. 154(b) by 21 days.

(21) Appl. No.: 16/863,235

(22) Filed: Apr. 30, 2020

(65) Prior Publication Data

US 2021/0339849 A1 Nov. 4, 2021

(51) Int. Cl.
*B64C 25/62* (2006.01)
*B64C 39/06* (2006.01)
*B64C 29/02* (2006.01)

(52) U.S. Cl.
CPC .............. *B64C 25/62* (2013.01); *B64C 29/02* (2013.01); *B64C 39/06* (2013.01)

(58) Field of Classification Search
CPC .......... B64C 25/62; B64C 29/02; B64C 39/06
See application file for complete search history.

(56) References Cited

U.S. PATENT DOCUMENTS

| | | | | |
|---|---|---|---|---|
| 4,172,570 A | * | 10/1979 | Leoni | F16F 7/10 244/104 CS |
| 4,537,372 A | * | 8/1985 | Forizs | B64C 29/0033 244/12.4 |
| 6,227,494 B1 | * | 5/2001 | Turner | B64G 1/22 244/100 R |
| 7,621,382 B2 | * | 11/2009 | Zdeb | F16F 9/512 188/297 |
| 7,784,772 B2 | * | 8/2010 | Knopp | F16F 9/0218 267/74 |
| 9,033,276 B1 | * | 5/2015 | Calvert | B64C 25/10 244/102 R |
| 9,963,228 B2 | | 5/2018 | McCullough et al. | |
| 10,597,164 B2 | | 3/2020 | Oldroyd et al. | |
| 10,618,647 B2 | | 4/2020 | Mccullough et al. | |
| 11,059,582 B2 | * | 7/2021 | Nahuel-Andrejuk | G01D 21/02 |
| 2004/0211631 A1 | * | 10/2004 | Hsu | F15B 15/222 188/284 |
| 2007/0221783 A1 | * | 9/2007 | Parks | G06Q 30/08 244/102 A |

(Continued)

OTHER PUBLICATIONS

Shedbale et al. "Review on Viscoelastic Materials used in Viscoelastic Dampers" (Year: 2017).*

*Primary Examiner* — Assres H Woldemaryam
(74) *Attorney, Agent, or Firm* — Lawrence Youst PLLC

(57) ABSTRACT

A damping landing gear assembly for a vertical takeoff and landing aircraft includes a spring housing forming a spring chamber, a spring disposed in the spring chamber and a plunger slidably coupled to the spring housing and movable between a compressed position and an extended position. The spring biases the plunger into the extended position during flight. The vertical takeoff and landing aircraft experiences a landing force during landing. The landing force compresses the plunger into the compressed position against the bias of the spring, thereby absorbing at least a portion of the landing force.

20 Claims, 12 Drawing Sheets

(56) References Cited

U.S. PATENT DOCUMENTS

| | | | |
|---|---|---|---|
| 2015/0353197 A1* | 12/2015 | Alber | B64C 29/02 |
| | | | 244/2 |
| 2016/0096613 A1* | 4/2016 | Johnson | B64C 25/32 |
| | | | 244/13 |
| 2017/0021924 A1* | 1/2017 | Kubik | B64C 27/48 |
| 2017/0326934 A1* | 11/2017 | Wehr | F16F 9/52 |
| 2017/0327219 A1* | 11/2017 | Alber | H02S 20/00 |
| 2018/0002011 A1* | 1/2018 | McCullough | B64C 27/28 |
| 2018/0002026 A1* | 1/2018 | Oldroyd | B64D 27/12 |
| 2018/0339772 A1 | 11/2018 | McCullough et al. | |
| 2019/0211896 A1* | 7/2019 | Prevost | F16F 1/32 |
| 2020/0062384 A1 | 2/2020 | McCullough et al. | |
| 2020/0122822 A1* | 4/2020 | Bosworth | B64C 39/024 |
| 2020/0140078 A1* | 5/2020 | Lu | B64C 25/34 |

\* cited by examiner

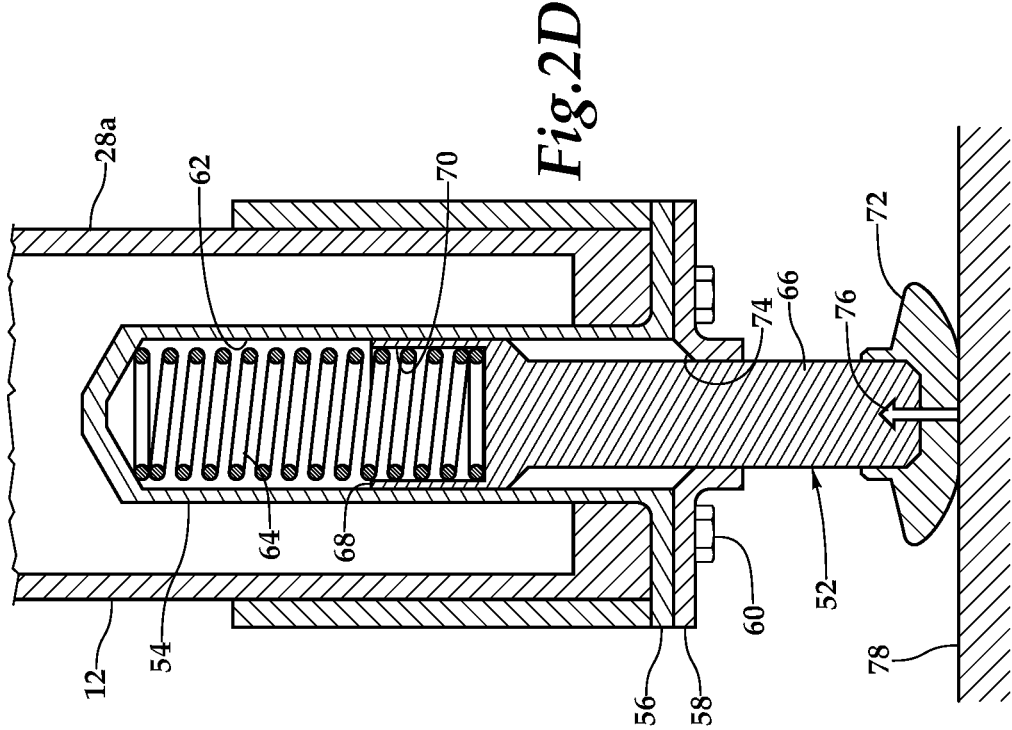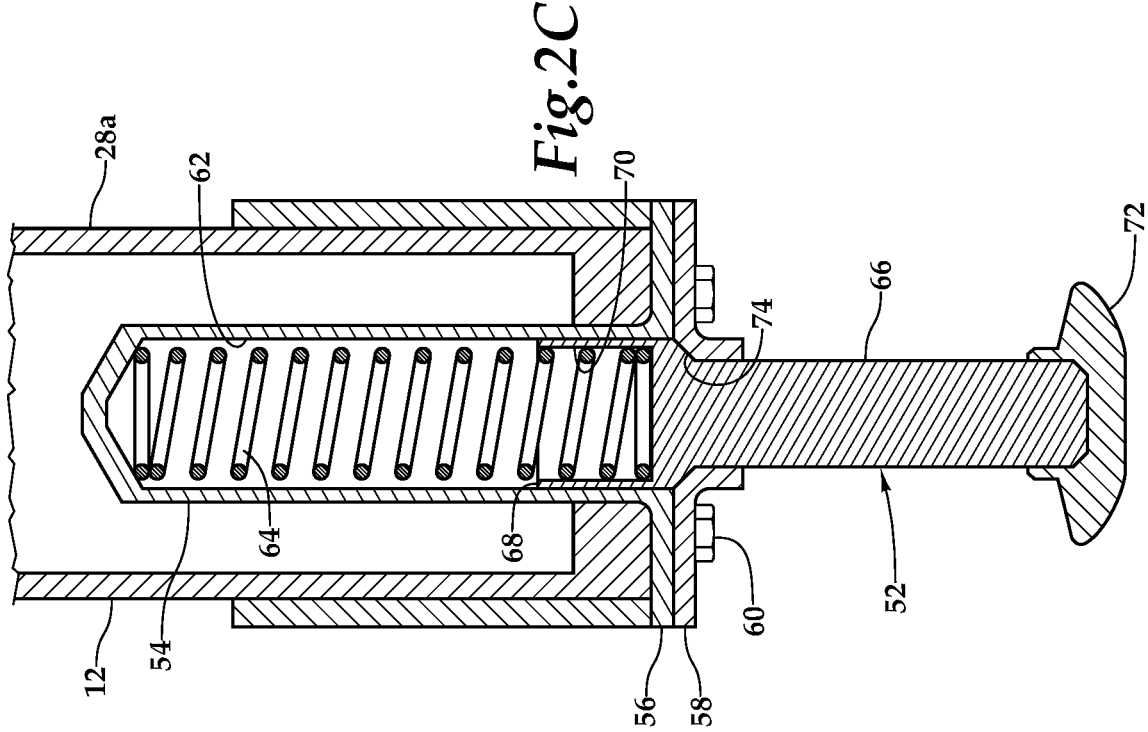

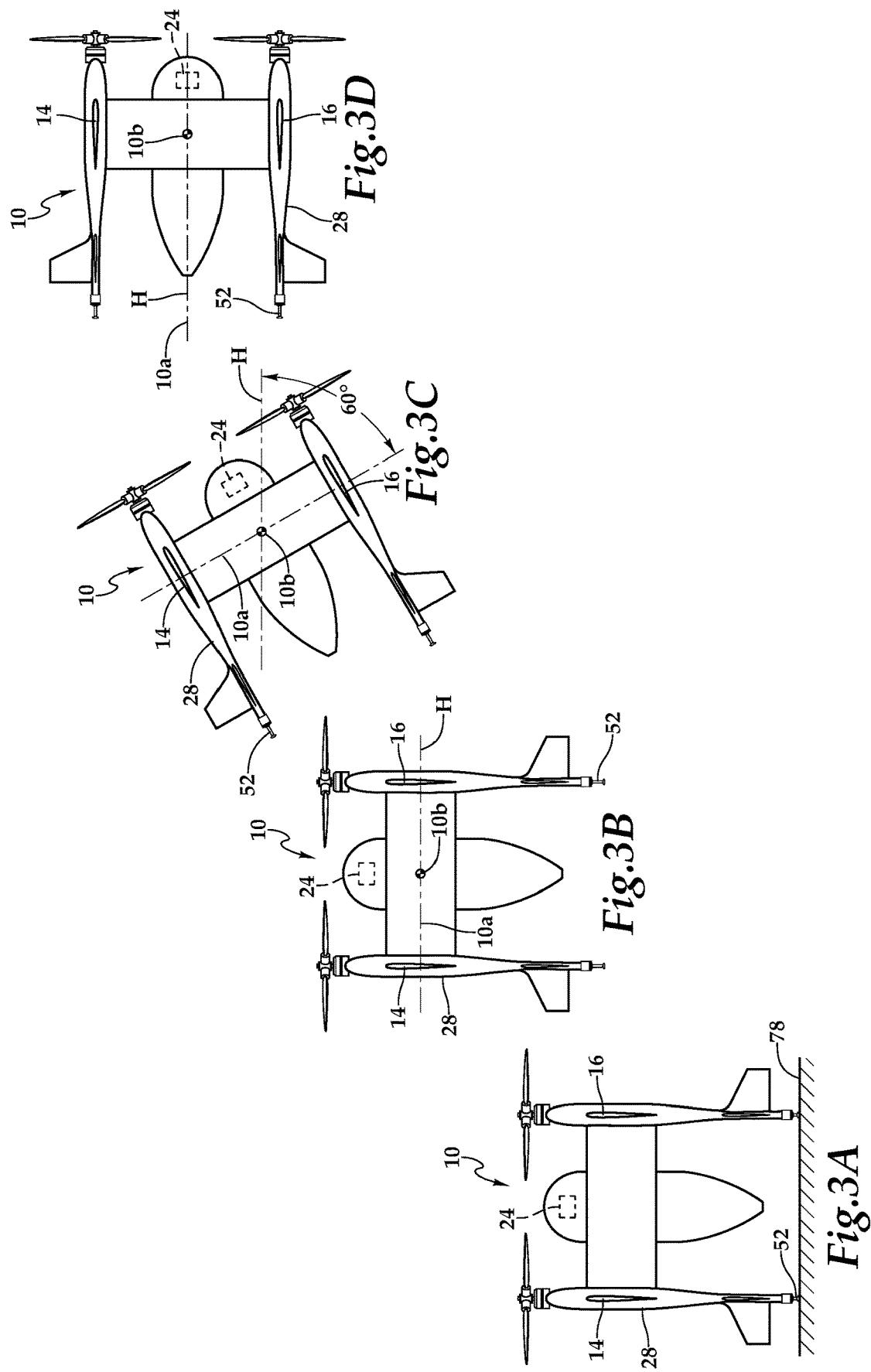

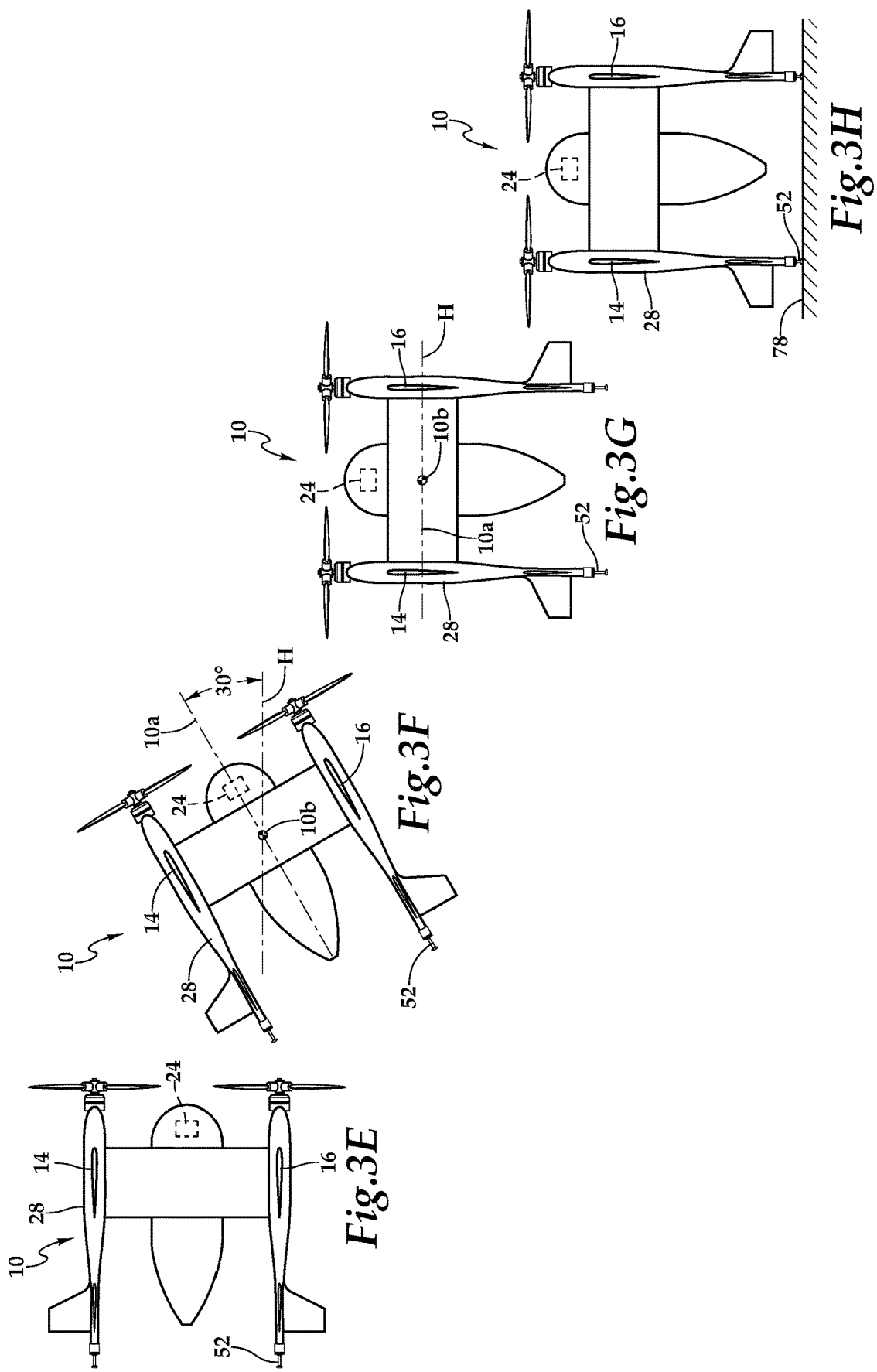

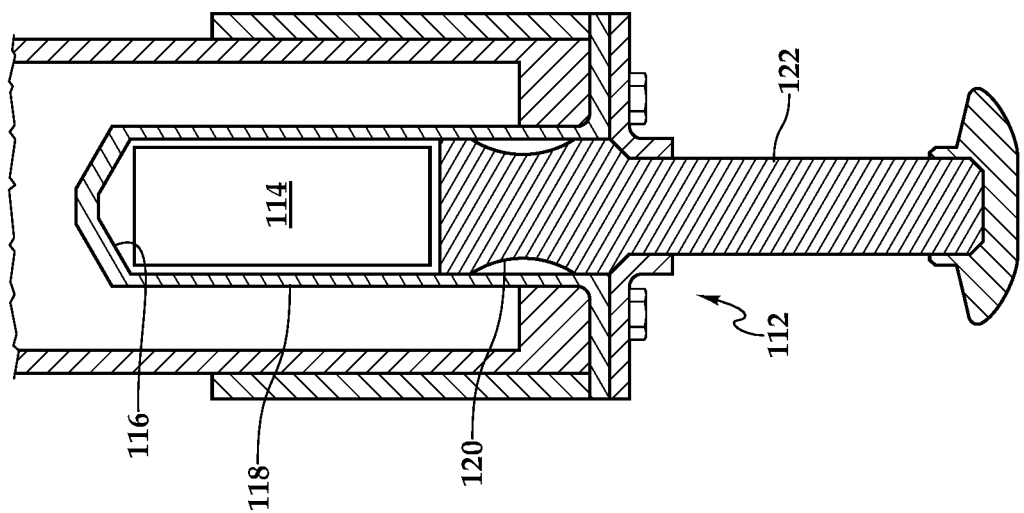
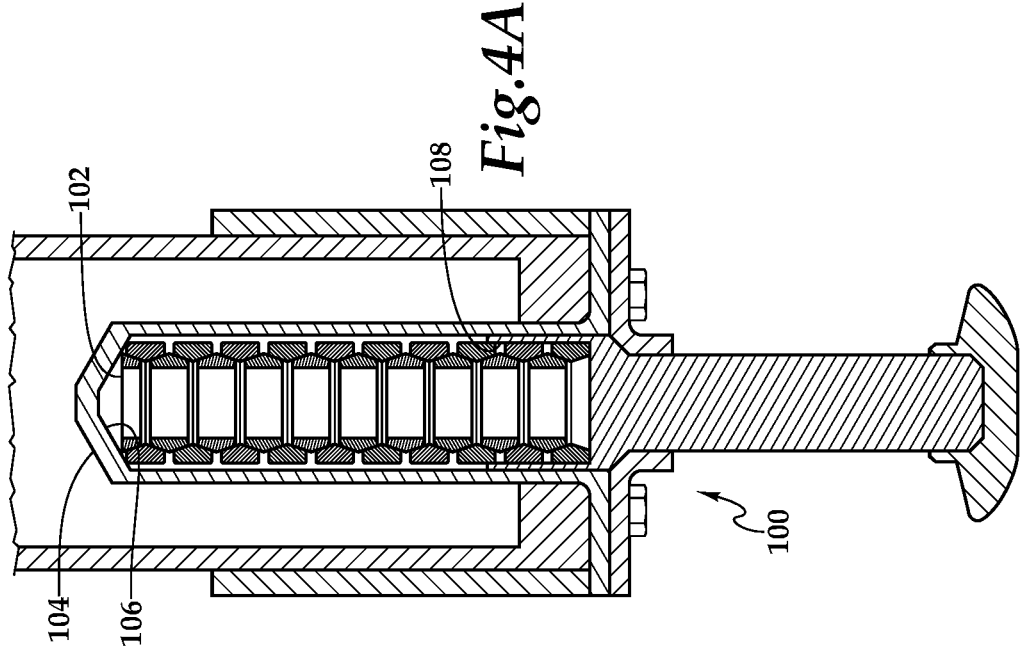

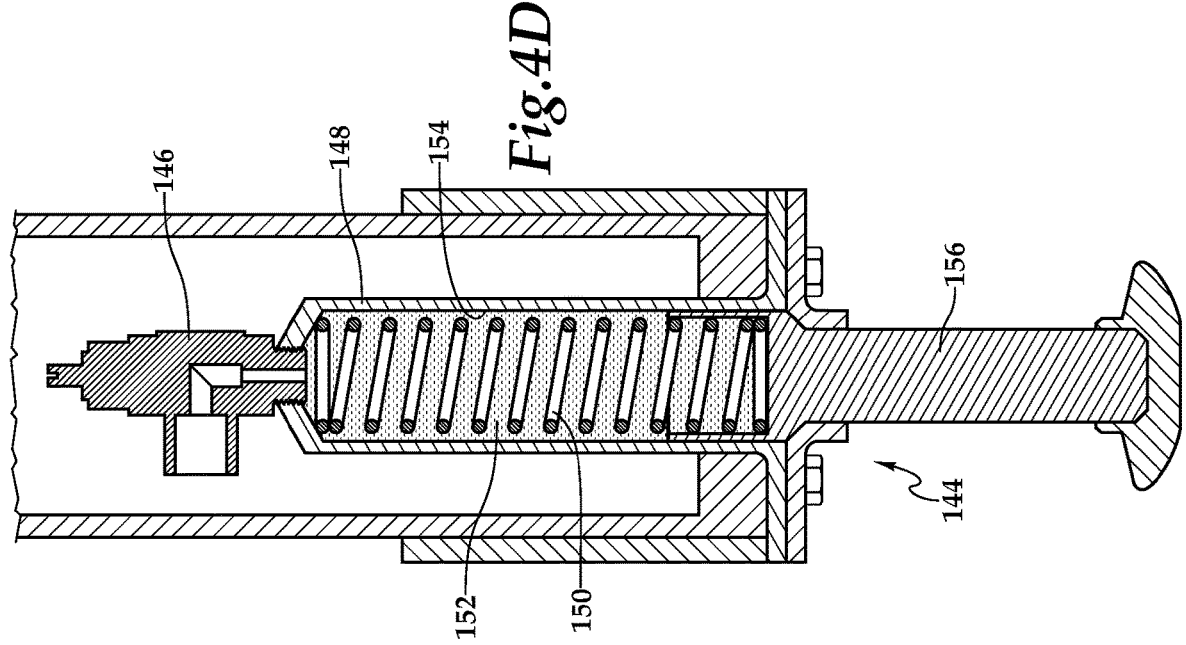
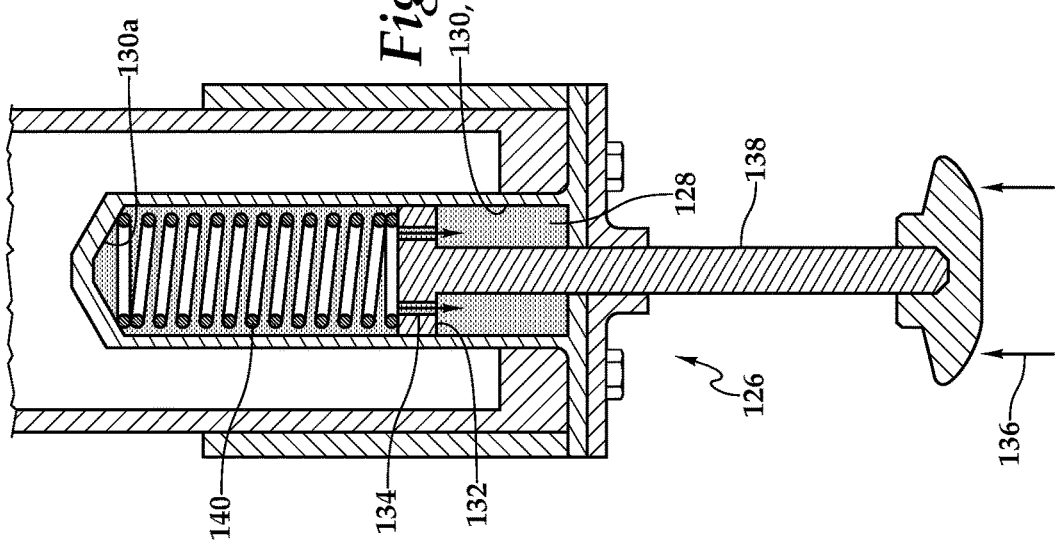

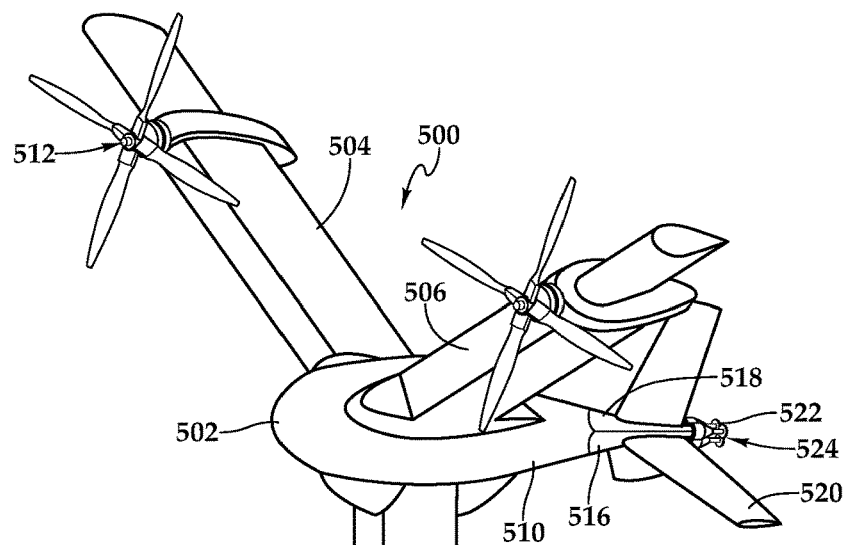
*Fig.8A*
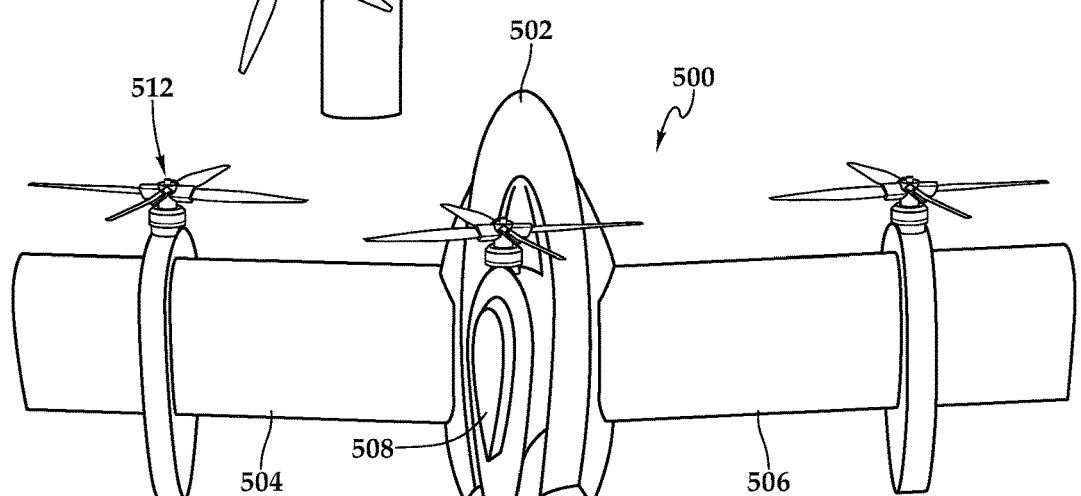
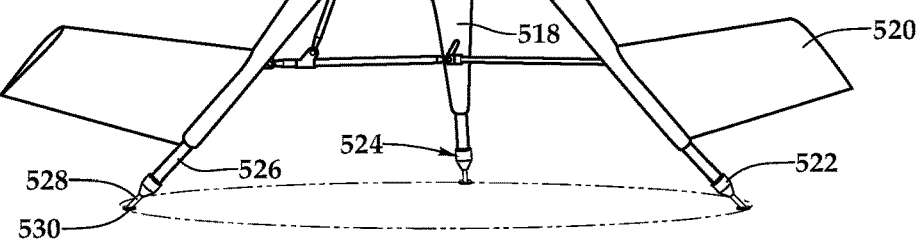
*Fig.8B*

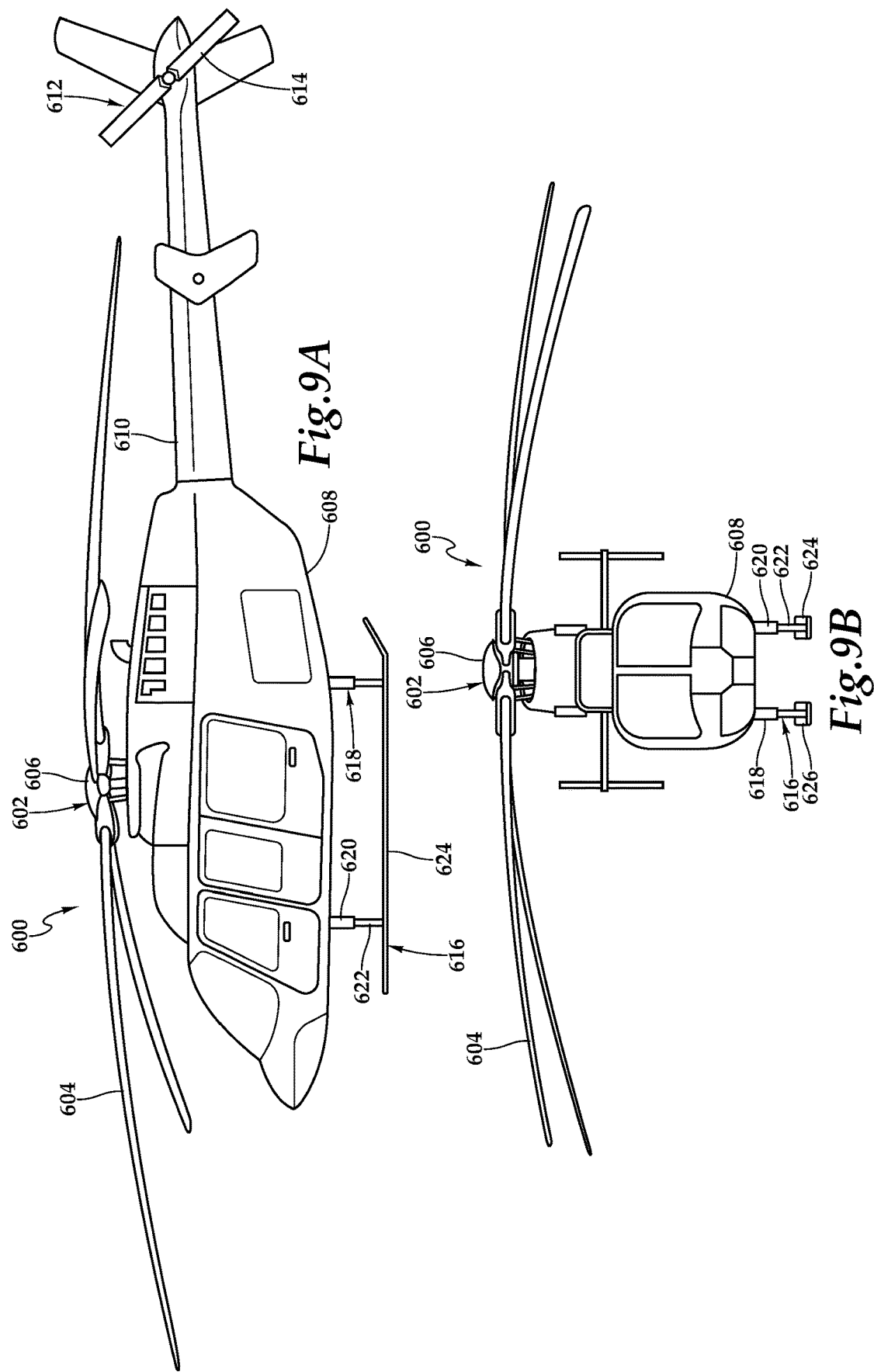

DAMPING LANDING GEAR SYSTEMS FOR VTOL AIRCRAFT

TECHNICAL FIELD OF THE DISCLOSURE

The present disclosure relates, in general, to landing gear systems for vertical takeoff and landing aircraft and, in particular, to landing gear systems utilizing a spring to absorb, or dampen, the landing force experienced by the aircraft during landing, thereby improving landing stability.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One type of VTOL aircraft is a helicopter, which is a rotorcraft having one or more rotors that provide lift and thrust to the aircraft. The rotors not only enable hovering and vertical takeoff and landing, but also enable forward, backward and lateral flight. Other types of VTOL aircraft utilize rotatable proprotors or wings that can change their plane of rotation, or orientation, based on whether the aircraft is flying in VTOL flight mode or forward flight mode.

While these attributes make VTOL aircraft highly versatile for use in congested, isolated or remote areas, landing gear systems for existing VTOL aircraft suffer from several drawbacks. For example, wheel-based landing gear systems for VTOL aircraft add excessive weight and drag to the aircraft. Other VTOL aircraft use fixed appendages upon which to land, although such appendages often produce undue amounts of drag. Existing landing gear systems may fail to absorb an adequate amount of shock during landing, resulting in occupant discomfort or injury and/or damage to the components of the aircraft. Existing landing gear systems may also have difficulty landing on uneven surfaces such as sandy or rocky surfaces and fail to provide a push-off effect to help propel the aircraft upward during takeoff. Accordingly, a need has arisen for damping landing gear systems that address these and other drawbacks of existing landing gear systems for VTOL aircraft.

SUMMARY

In a first aspect, the present disclosure is directed to a damping landing gear assembly for a vertical takeoff and landing aircraft including a spring housing forming a spring chamber, a spring disposed in the spring chamber and a plunger slidably coupled to the spring housing and movable between a compressed position and an extended position. The spring biases the plunger into the extended position during flight. The vertical takeoff and landing aircraft experiences a landing force during landing. The landing force compresses the plunger into the compressed position against the bias of the spring, thereby absorbing at least a portion of the landing force.

In some embodiments, the damping landing gear assembly may include a flange coupled to the distal end of the spring housing, the flange also configured to be coupled to the airframe of the vertical takeoff and landing aircraft. In certain embodiments, the spring chamber may be a cylindrical spring chamber. In some embodiments, the spring may be disposed between the plunger and the proximal end of the spring housing. In certain embodiments, the vertical takeoff and landing aircraft may be configured to takeoff and land on a landing surface, the spring biasing the plunger against the landing surface during takeoff to generate a push-off effect. In some embodiments, the spring may be a compression spring, a friction spring, a viscous spring, a solid packing material and/or a gas spring. In certain embodiments, the spring housing may form an orifice. In some embodiments, the damping landing gear assembly may include an adjustable orifice coupled to the proximal end of the spring housing. In certain embodiments, the plunger may have a proximal end forming a piston disposed in the spring chamber. In some embodiments, the piston may form a piston cavity configured to receive the spring. In certain embodiments, the damping landing gear assembly may include a landing foot coupled to the distal end of the plunger. In some embodiments, the landing foot may be a hard surface landing foot, a soft surface landing foot or a water surface landing foot.

In a second aspect, the present disclosure is directed to a vertical takeoff and landing aircraft including a fuselage and a damping landing gear assembly. The damping landing gear assembly includes a spring housing forming a spring chamber, a spring disposed in the spring chamber and a plunger slidably coupled to the spring housing and movable between a compressed position and an extended position. The spring biases the plunger into the extended position during flight. The vertical takeoff and landing aircraft experiences a landing force during landing. The landing force compresses the plunger into the compressed position against the bias of the spring, thereby absorbing at least a portion of the landing force.

In some embodiments, the spring housing may be disposed inside the airframe of the vertical takeoff and landing aircraft. In certain embodiments, the vertical takeoff and landing aircraft may include an airframe having first and second wings with first and second pylons extending therebetween, the fuselage coupled to the pylons. In such embodiments, the vertical takeoff and landing aircraft may include a two-dimensional distributed thrust array attached to the airframe, the thrust array including a plurality of propulsion assemblies coupled to the first wing and a plurality of propulsion assemblies coupled to the second wing. Also in such embodiments, the damping landing gear assembly may include a plurality of damping landing gear assemblies, each damping landing gear assembly coupled to the aft end of a respective one of the propulsion assemblies. In some embodiments, the vertical takeoff and landing aircraft may be a closed wing aircraft including a closed wing surrounding the fuselage. In such embodiments, a plurality of damping landing gear assemblies may be coupled to the aft side of the closed wing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2D are various views of a damping landing gear assembly for a VTOL aircraft in accordance with embodiments of the present disclosure;

FIGS. 3A-3H are schematic illustrations of the VTOL aircraft of FIGS. 1A-1B in a sequential flight operating scenario in accordance with embodiments of the present disclosure;

FIGS. 4A-4D are cross-sectional views of different damping landing gear assemblies having various spring configurations in accordance with embodiments of the present disclosure;

FIGS. 8A-8B are schematic illustrations of a VTOL aircraft having a radially extendable tailboom assembly with a damping landing gear system in accordance with embodiments of the present disclosure; and FIGS. 9A-9B are schematic illustrations of a helicopter having a damping landing gear system in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
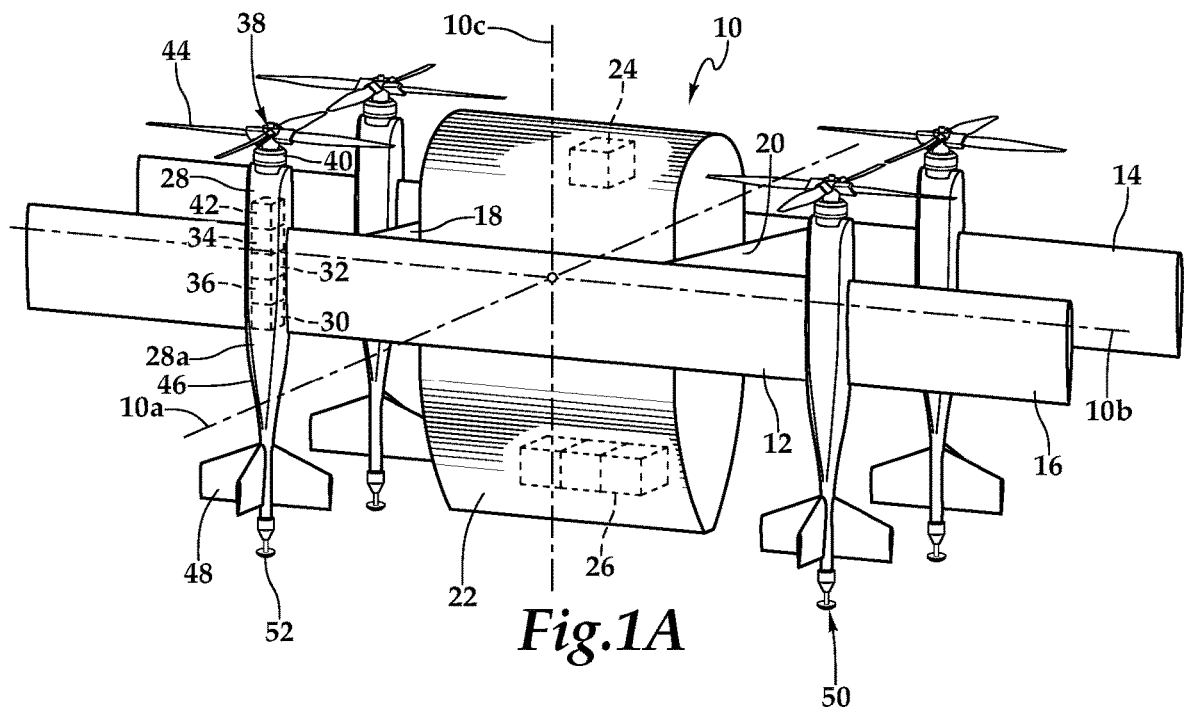
FIGS. 1A-1B are schematic illustrations of a vertical takeoff and landing (VTOL) aircraft having a damping landing gear system in accordance with embodiments of the present disclosure.
Figure 1B:
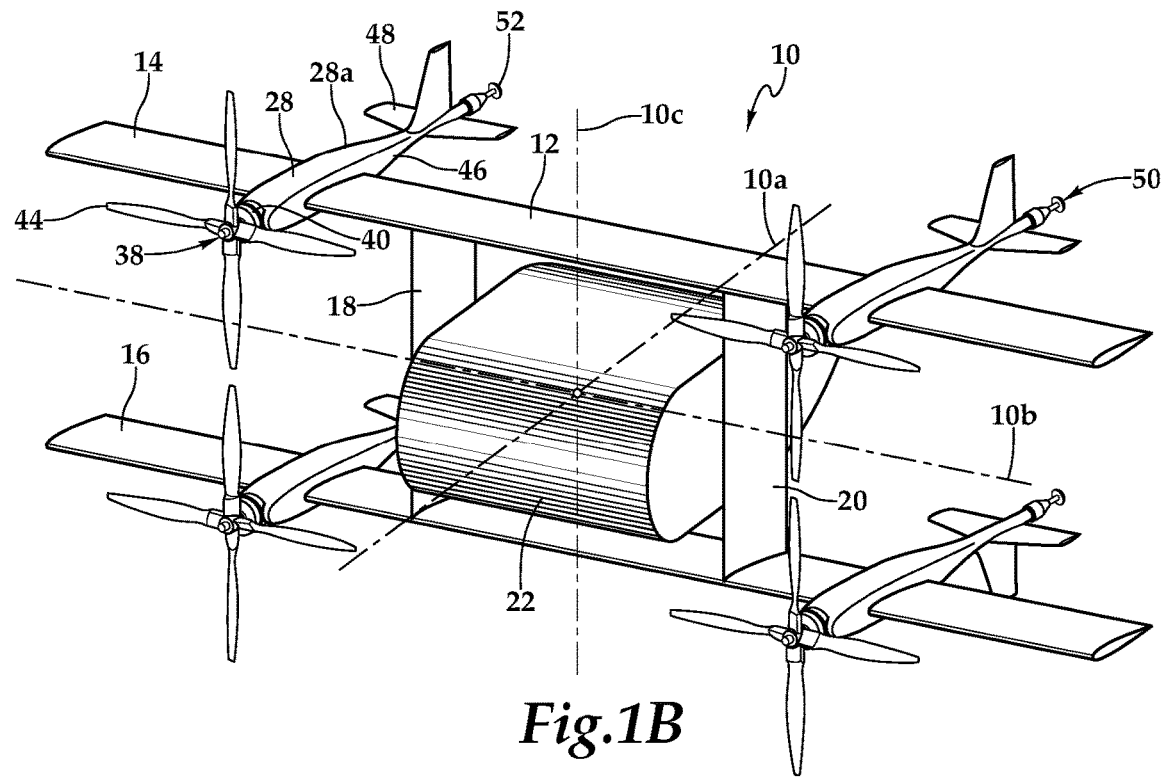
Figure 2A:
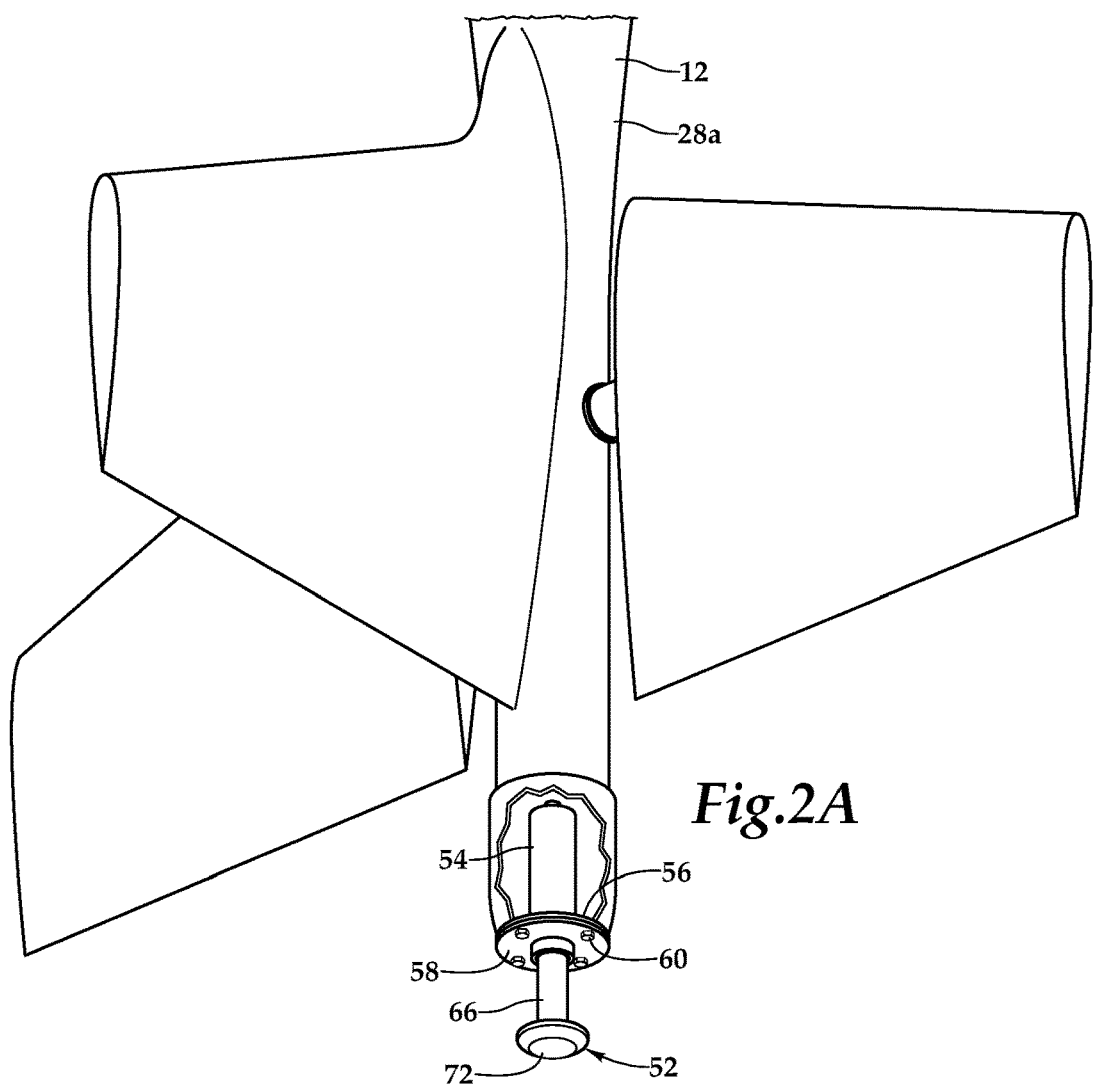
Figure 2B:
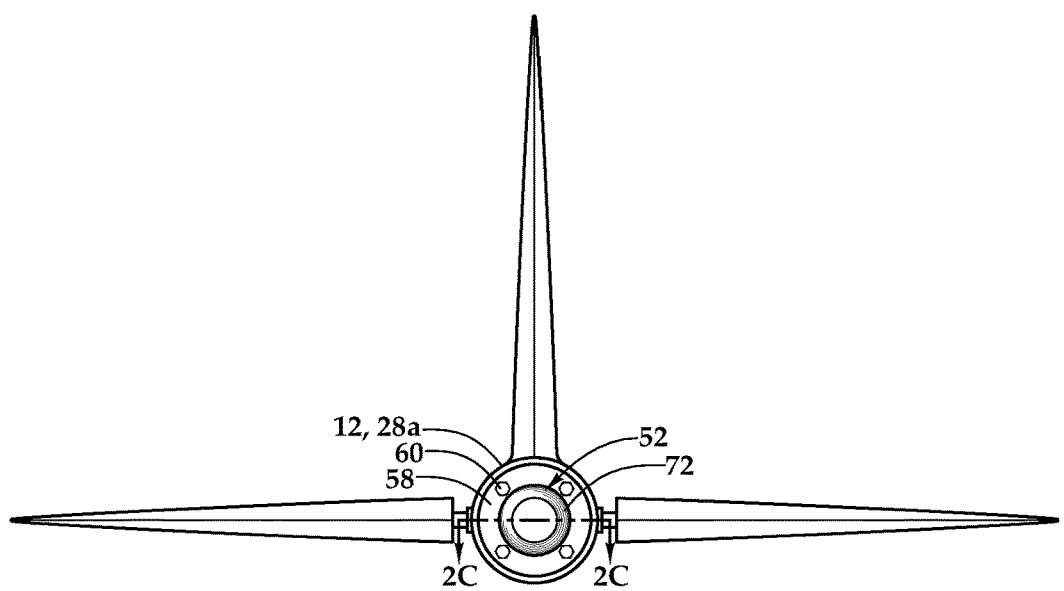

Referring to FIGS. 1A-1B in the drawings, various views of a vertical takeoff and landing (VTOL) aircraft 10 operable to transition between thrust-borne lift in a VTOL orientation and wing-borne lift in a biplane orientation are depicted. FIG. 1A depicts VTOL aircraft 10 in the VTOL orientation wherein the propulsion assemblies provide thrust-borne lift. FIG. 1B depicts VTOL aircraft 10 in the biplane orientation wherein the propulsion assemblies provide forward thrust with the forward airspeed of VTOL aircraft 10 providing wing-borne lift enabling VTOL aircraft 10 to have a high speed and/or high endurance forward flight mode. VTOL aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, VTOL aircraft 10 has a level flight attitude.

In the illustrated embodiment, VTOL aircraft 10 has an airframe 12 including wings 14, 16 each having an airfoil cross-section that generates lift responsive to the forward airspeed of VTOL aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the biplane orientation of VTOL aircraft 10 shown in FIG. 1B, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. A fuselage 22 is coupled to, and interposed between, pylons 18, 20. Fuselage 22 is also positioned between wings 14, 16.

Fuselage 22, wings 14, 16 and/or pylons 18, 20 may include internal passageways operable to contain flight control systems, energy sources, communication lines and other desired systems. For example, fuselage 22 houses a flight control system 24 of VTOL aircraft 10. Flight control system 24 may be a redundant digital flight control system including multiple independent flight control computers. For example, the use of a triply redundant flight control system 24 improves the overall safety and reliability of VTOL aircraft 10 in the event of a failure in flight control system 24. Flight control system 24 preferably includes non-transitory computer readable storage media including a set of computer instructions executable by one or more processors for controlling the operation of VTOL aircraft 10. Flight control system 24 may be implemented on one or more general-purpose computers, special purpose computers or other machines with memory and processing capability. For example, flight control system 24 may include one or more memory storage modules including, but not limited to, internal storage memory such as random access memory, non-volatile memory such as read only memory, removable memory such as magnetic storage memory, optical storage, solid-state storage memory or other suitable memory storage entities. Flight control system 24 may be a microprocessor-based system operable to execute program code in the form of machine-executable instructions. In addition, flight control system 24 may be selectively connectable to other computer systems via a proprietary encrypted network, a public encrypted network, the Internet or other suitable communication network that may include both wired and wireless connections.

Fuselage 22, wings 14, 16 and/or pylons 18, 20 may contain one or more electrical power sources depicted as one or more batteries 26 in fuselage 22. Batteries 26 supply electrical power to flight control system 24. In some embodiments, batteries 26 may be used to supply electrical power for the distributed thrust array of VTOL aircraft 10. Fuselage 22, wings 14, 16 and pylons 18, 20 also contain a communication network that enables flight control system 24 to communicate with the distributed thrust array of VTOL aircraft 10. In the illustrated embodiment, VTOL aircraft 10 has a two-dimensional distributed thrust array that is coupled to wings 14, 16. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of VTOL aircraft 10 includes a plurality of propulsion assemblies 28. In the illustrated embodiment, two propulsion assemblies 28 are coupled to wing 14 and two propulsion assemblies 28 are coupled to wing 16 such that each propulsion assembly 28 has a rotor disc that is outboard of fuselage 22. Even though the illustrated embodiment depicts four propulsion assemblies, the distributed thrust array of VTOL aircraft 10 could have other numbers of propulsion assemblies both greater than or less than four. Also, even though the illustrated embodiment depicts propulsion assemblies 28 in a mid-wing configuration, the distributed thrust array of VTOL aircraft 10 could have propulsion assemblies coupled to the wings in a low wing configuration, a high wing configuration or any combination or permutations thereof. In the illustrated embodiment, propulsion assemblies 28 are variable speed propulsion assemblies having fixed pitch rotor blades and thrust vectoring capability. Depending upon the implementation, propulsion assemblies 28 may have longitudinal thrust vectoring capability, lateral thrust vectoring capability or omnidirectional thrust vectoring capability. In other embodiments, propulsion assemblies 28 may be single speed propulsion assemblies, may have variable pitch rotor blades and/or may be non-thrust vectoring propulsion assemblies.

Propulsion assemblies 28 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 28 can be decoupled from airframe 12 by simple operations and another propulsion assembly 28 can then be attached to airframe 12. In other embodiments, propulsion assemblies 28 may be permanently coupled to wings 14, 16.

As best seen in FIG. 1A, each propulsion assembly 28 includes a nacelle 28a that houses components including a battery 30, an electronic speed controller 32, a gimbal actuator 34, an electronics node 36, sensors and other desired electronic equipment. Nacelle 28a also supports a propulsion system 38 including a gimbal 40, a variable speed electric motor 42 and a rotor assembly 44. Fuselage 22, wings 14, 16, pylons 18, 20 and nacelles 28a as well as their various frames, supports, longerons, stringers, bulkheads, spars, ribs and/or skins form airframe 12 of VTOL aircraft 10. Extending from the aft end of nacelle 28a is a tail assembly 46 that includes aerosurfaces 48. As the power for each propulsion assembly 28 is provided by batteries 30 housed within the respective nacelle 28a, VTOL aircraft 10 has a distributed power system for the distributed thrust array. Alternatively or additionally, electrical power may be supplied to electric motors 42 and/or batteries 30 disposed within nacelles 28a from batteries 26 in fuselage 22 via the communications network. In other embodiments, power for propulsion assemblies 28 of VTOL aircraft 10 may be provided by one or more internal combustion engines, electric generators and/or hydraulic motors. In the illustrated embodiment, aerosurfaces 48 of propulsion assemblies 28 include stationary horizontal and vertical stabilizers. In other embodiments, aerosurfaces 48 may be active aerosurfaces that serve as elevators to control the pitch or angle of attack of wings 14, 16 and/or ailerons to control the roll or bank of VTOL aircraft 10 in the biplane orientation of VTOL aircraft 10. Aerosurfaces 48 also serve to enhance hover stability in the VTOL orientation of VTOL aircraft 10.

Flight control system 24 communicates via the wired communications network of airframe 12 with electronics nodes 36 of propulsion assemblies 28. Flight control system 24 receives sensor data from and sends flight command information to electronics nodes 36 such that each propulsion assembly 28 may be individually and independently controlled and operated. For example, flight control system 24 is operable to individually and independently control the speed and the thrust vector of each propulsion assembly 28. Flight control system 24 may autonomously control some or all aspects of flight operation for VTOL aircraft 10. Flight control system 24 is also operable to communicate with remote systems, such as a ground station via a wireless communications protocol. The remote system may be operable to receive flight data from and provide commands to flight control system 24 to enable remote flight control over some or all aspects of flight operation for VTOL aircraft 10.

Each propulsion assembly 28 includes rotor assembly 44 that is coupled to an output drive of a respective electrical motor 42 that rotates rotor assembly 44 in a rotational plane to generate thrust for VTOL aircraft 10. In the illustrated embodiment, rotor assemblies 44 each include four rotor blades having a fixed pitch. In other embodiments, the rotor assemblies could have other numbers of rotor blades including rotor assemblies having less than or more than four rotor blades. Alternatively or additionally, the rotor assemblies could have variable pitch rotor blades with collective and/or cyclic pitch control. Each electrical motor 42 is paired with a rotor assembly 44 to form a propulsion system 38. In the illustrated embodiment, each propulsion system 38 has a two-axis tilting degree of freedom relative to nacelle 28a provided by gimbal 40 such that propulsion assemblies 28 are omnidirectional thrust vectoring propulsion assemblies. In other embodiments, the propulsion systems may have a single-axis tilting degree of freedom, in which case the propulsion assemblies could act as longitudinal and/or lateral thrust vectoring propulsion assemblies.

VTOL aircraft 10 includes a damping landing gear system 50. Previous tail sitting aircraft have included a rigid tail structure or empennage used as the landing gear for the aircraft, resulting in a jarring or unstable landing that is detrimental to occupant comfort and the structural integrity of the aircraft. While some previous VTOL aircraft have included fixed appendages or wheels on which to land, such landing gear systems have large weight and drag penalties and fail to provide sufficient damping to smooth the landing of the aircraft. Similarly, VTOL aircraft having deforming or elastomeric landing feet fail to provide adequate damping of landing forces and may result in jarring bounces when the aircraft is attempting to land. Damping landing gear system 50 addresses these and other deficiencies of previous landing gear systems by including damping landing gear assemblies 52 coupled to airframe 12 on which to land VTOL aircraft 10. In the implementation shown in FIGS. 1A-1B, each damping landing gear assembly 52 is coupled to the aft end of a respective propulsion assembly 28.

It should be appreciated that VTOL aircraft 10 is merely illustrative of a variety of aircraft that can implement the embodiments disclosed herein. Indeed, damping landing gear system 50 may be implemented on any aircraft. Other aircraft implementations can include hybrid aircraft, tiltwing aircraft, tiltrotor aircraft, quad tiltrotor aircraft, unmanned aircraft, gyrocopters, helicopters, drones and the like. As such, those skilled in the art will recognize that damping landing gear system 50 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2D in the drawings, one of the damping landing gear assemblies 52 of VTOL aircraft 10 is schematically illustrated. Damping landing gear assembly 52 is disposed on the aft end of nacelle 28a. Damping landing gear assembly 52 includes a spring housing 54 disposed inside airframe 12 of VTOL aircraft 10. More particularly, spring housing 54 resides within the portion of airframe 12 that supports nacelle 28a. The distal end of spring housing 54 includes a flange 56. Flange 56 is coupled to airframe 12 of VTOL aircraft 10, and more particularly to the aft end of nacelle 28a, such that spring housing 54 is coupled to airframe 12 via flange 56. Flange 56 is illustrated as being integral with spring housing 54, although in other embodiments flange 56 may be a separate component that is coupled to spring housing 54. A cover plate 58 covers flange 56 to further protect and secure spring housing 54. Flange 56 and cover plate 58 are coupled to airframe 12 using bolts 60, although flange 56 and cover plate 58 may be secured to airframe 12 in any manner. Spring housing 54 forms a spring chamber 62 in which a spring 64 is disposed. Spring chamber 62 is generally cylindrical to accommodate the shape of spring 64. In other embodiments, spring chamber 62 may have other shapes depending on the size, shape, type and other parameters of spring 64. In the illustrated embodiment, spring 64 is a compression spring.

Damping landing gear assembly 52 includes a plunger 66 slidably or telescopingly coupled to spring housing 54. The proximal end of plunger 66 forms a piston 68 disposed in spring chamber 62. Piston 68 forms a piston cavity 70 shaped to receive the distal end of spring 64 such that spring 64 is disposed between plunger 66 and the proximal end of spring housing 54. Piston cavity 70 is substantially cylindrical to accommodate the shape of compression spring 64, although in other embodiments piston cavity 70 may form other shapes to accommodate other spring shapes or types. A landing foot 72 is coupled to the distal end of plunger 66. Although landing foot 72 is shown as a separate component from plunger 66, in other embodiments plunger 66 and landing foot 72 may be integral, or monolithic. Landing foot 72 may also be interchangeable to allow landing foot 72 to be conveniently removed from plunger 66 and replaced with a new or different type of landing foot. Spring housing 54, plunger 66 and landing foot 72 may be formed from a polymer, composite, carbon-based or metallic material. For example, spring housing 54, plunger 66 and/or landing foot 72 may be formed from a metal such as aluminum, titanium or steel. Spring housing 54, plunger 66 and landing foot 72 may otherwise be formed from any material having properties sufficient for carrying out the functions of damping landing gear assembly 52. The various components of damping landing gear assembly 52 described herein including spring housing 54, spring 64, plunger 66 and landing foot 72 may be manufactured using any additive, subtractive or formative manufacturing technique including, but not limited to, extrusion, machining, 3D printing, laser cutting, stamping, welding or casting as well as others.

As best seen in FIGS. 2C-2D, plunger 66 is movable, or translatable, between the extended position shown in FIG. 2C and the compressed position shown in FIG. 2D. Spring 64 biases plunger 66 into the extended position during flight of VTOL aircraft 10. Cover plate 58 forms a tapered piston limiter 74 to prevent plunger 66 from being ejected from spring chamber 62 by spring 64. In other embodiments, spring housing 54 may form a piston limiter instead of cover plate 58. When VTOL aircraft 10 lands, VTOL aircraft 10 experiences a landing force 76 from landing surface 78. Landing force 76 compresses plunger 66 into spring chamber 62 against the bias of spring 64 into the compressed position to absorb landing force 76 upon landing. The absorption of landing force 76 alleviates jarring motions as VTOL aircraft 10 lands, thereby increasing landing stability and reducing structural stresses or failures. Damping landing gear assembly 52 is lightweight and has reduced drag compared to previous landing gear systems for VTOL aircraft. Furthermore, because each damping landing gear assembly 52 on a given VTOL aircraft may have different degrees of compression relative to one another, damping landing gear assembly 52 allows VTOL aircraft 10 to more easily land on uneven surfaces. In addition, when VTOL aircraft 10 takes off from landing surface 78, spring 64 biases plunger 66 against landing surface 78 to generate a push-off effect to help launch VTOL aircraft 10.

Referring to FIGS. 3A-3H in the drawings, a sequential flight-operating scenario of VTOL aircraft 10 is depicted. As best seen in FIG. 3A, VTOL aircraft 10 is in a tail sitter position on landing surface 78. When VTOL aircraft 10 is ready for a mission, flight control system 24 commences operations providing flight commands to the various components of VTOL aircraft 10. Flight control system 24 may be operating responsive to autonomous flight control, remote flight control, a pilot or a combination thereof. For example, it may be desirable to utilize remote flight control during certain maneuvers such as takeoff and landing but rely on autonomous flight control during hover, high speed forward flight and transitions between wing-borne flight and thrust-borne flight.

When taking off, damping landing gear assemblies 52 move from the compressed position shown in FIG. 3A into the extended position shown in FIG. 3B to provide a push-off effect for VTOL aircraft 10. In FIG. 3B, VTOL aircraft 10 has performed a vertical takeoff and is engaged in thrust-borne lift in the VTOL orientation of VTOL aircraft 10. As illustrated, the rotor assemblies of propulsion assemblies 28 are each rotating in the same horizontal plane. As longitudinal axis 10a and lateral axis 10b (denoted as a target) are both in a horizontal plane H that is normal to the local vertical in the earth's reference frame, VTOL aircraft 10 has a level flight attitude. As discussed herein, flight control system 24 independently controls and operates each propulsion assembly 28 including independently controlling speed and thrust vector. During hover, flight control system 24 may utilize differential speed control and/or differential or collective thrust vectoring of propulsion assemblies 28 to provide hover stability for VTOL aircraft 10 and to provide pitch, roll, yaw and translation authority for VTOL aircraft 10.

After vertical ascent to the desired elevation, VTOL aircraft 10 may begin the transition from thrust-borne lift to wing-borne lift. As best seen from the progression of FIGS. 3B-3D, VTOL aircraft 10 is operable to pitch down from the VTOL orientation toward the biplane orientation to enable high speed and/or long range forward flight. In the snapshot during this transition shown in FIG. 3C, longitudinal axis 10a extends out of the horizontal plane H such that VTOL aircraft 10 has an inclined flight attitude of about 60 degrees pitch down. Flight control system 24 may achieve this operation through speed control of some or all of propulsion assemblies 28, thrust vectoring of some or all of propulsion assemblies 28 or any combination thereof.

As best seen in FIGS. 3D-3E, the rotor assemblies of propulsion assemblies 28 are each rotating in the same vertical plane. In the biplane orientation, wing 14 is above wing 16. By convention, longitudinal axis 10a has been reset to be in the horizontal plane H, which also includes lateral axis 10b, such that VTOL aircraft 10 has a level flight attitude in the biplane orientation. As forward flight with wing-borne lift requires significantly less power than VTOL flight with thrust-borne lift, the operating speed of some or all of propulsion assemblies 28 may be reduced. In certain embodiments, some of the propulsion assemblies of VTOL aircraft 10 may be shut down during forward flight. In the biplane orientation, the independent control provided by flight control system 24 over each propulsion assembly 28 provides pitch, roll and yaw authority using collective or differential thrust vectoring, differential speed control or any combination thereof.

As VTOL aircraft 10 approaches the desired location, VTOL aircraft 10 may begin its transition from wing-borne lift to thrust-borne lift. As best seen from the progression of FIGS. 3E-3G, VTOL aircraft 10 is operable to pitch up from the biplane orientation to the VTOL orientation to enable, for example, a vertical landing operation. In the snapshot during this transition shown in FIG. 3F, longitudinal axis 10a extends out of the horizontal plane H such that VTOL aircraft 10 has an inclined flight attitude of about 30 degrees pitch up. Flight control system 24 may achieve this operation through speed control of some or all of propulsion assemblies 28, thrust vectoring of some or all of propulsion assemblies 28 or any combination thereof. In FIG. 3G, VTOL aircraft 10 has completed the transition from the biplane orientation to the VTOL orientation and, by convention, longitudinal axis 10a has been reset to be in the horizontal plane H which also includes lateral axis 10b such that VTOL aircraft 10 has a level flight attitude in the VTOL orientation. Once VTOL aircraft 10 has completed the transition to the VTOL orientation, VTOL aircraft 10 may commence its vertical descent to landing surface 78. As best seen in FIG. 3H, VTOL aircraft 10 has landed in a tail sitter orientation at the desired location. When landing, damping landing gear assemblies 52 are compressed against the bias of an internal spring to soften and stabilize the landing of VTOL aircraft 10.

Referring to FIGS. 4A-4D in the drawings, different damping landing gear assemblies having various springs and structural configurations are schematically illustrated. In FIG. 4A, damping landing gear assembly 100 utilizes a friction spring 102 instead of a compression spring. Because friction spring 102 has a generally cylindrical shape similar to compression spring 64 in FIGS. 2A-2D, spring housing 104 including spring chamber 106 and piston cavity 108 likewise have a generally cylindrical shape. In FIG. 4B, the spring of damping landing gear assembly 112 is a packing material 114. Packing material 114 is disposed within spring chamber 116 of spring housing 118 and may be any compressible material. Packing material 114 is compressed by piston 120 when the aircraft lands. In some embodiments, packing material 114 may be a solid viscoelastic material that improves damping, introduces a nonlinear damping response and/or dissipates as much energy in as low a stroke as possible. Non-limiting examples of a solid packing material 114 include silicone foam, rigid silicone, low density rubber or high density rubber as well as others. In other embodiments, packing material 114 is a gas such that damping landing gear assembly 112 utilizes a gas spring. In such embodiments, the gas within spring chamber 116 is compressed when the aircraft lands to dampen and stabilize the landing. The gas within spring chamber 116 may then expand when the aircraft is in flight to translate plunger 122 into the extended position.

In FIG. 4C, damping landing gear assembly 126 utilizes a fluid 128 within spring chamber 130 to dampen the landing of the aircraft. Piston 132 divides spring chamber 130 into a top spring chamber 130a and a bottom spring chamber 130b. Piston 132 also forms one or more orifices 134. When landing force 136 moves plunger 138 into the compressed position, fluid 128 moves from top spring chamber 130a to bottom spring chamber 130b. The size of orifices 134 as well as the type or viscosity of fluid 128 are among the parameters that determine the amount of damping provided by damping landing gear assembly 126. Fluid 128 thus acts as a viscous spring. Additional damping is provided by the bias of compression spring 140. When the aircraft is in flight, compression spring 140 moves plunger 138 back into the extended position, which causes fluid 128 to move from bottom spring chamber 130b to top spring chamber 130a. In some embodiments, fluid 128 may be a liquid such as oil. In other embodiments, fluid 128 may be a gas such as compressed air.

In FIG. 4D, damping landing gear assembly 144 includes an adjustable orifice 146 coupled to the proximal end of spring housing 148. Damping landing gear assembly 144 utilizes compression spring 150 and gas 152 within spring chamber 154 to provide damping for the aircraft during landing. When plunger 156 moves into the compressed position during landing, gas 152 resists the translation of plunger 156 by a resistance controlled by adjustable orifice 146. Damping landing gear assembly 144 is thus a variable resistance damping landing gear assembly. The landing of the aircraft is also softened by the bias of compression spring 150 against plunger 156 while the aircraft lands. Compression spring 150 also pushes plunger 156 into the extended position when the aircraft is in flight, causing air to re-enter spring chamber 154 via adjustable orifice 146. While damping landing gear assembly 144 is illustrated as including an adjustable orifice 146, in other embodiments spring housing 148 may form an orifice of fixed size. Gas 152, which is one of the springs utilized by damping landing gear assembly 144, may be any type of gas such as air that has a damping effect on the landing of the aircraft. In other embodiments, damping landing gear assembly 144 may utilize a spring having an adjustable or dual spring rate. Any combination of the springs disclosed in the illustrative embodiments may be utilized by the damping landing gear assemblies disclosed herein.

Figure 5A:
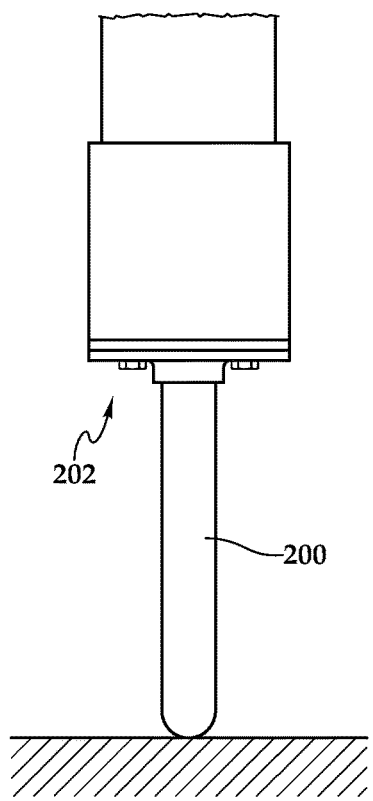
FIGS. 5A-5D are side views of different damping landing gear assemblies having various and interchangeable landing feet in accordance with embodiments of the present disclosure.
Figure 5B:
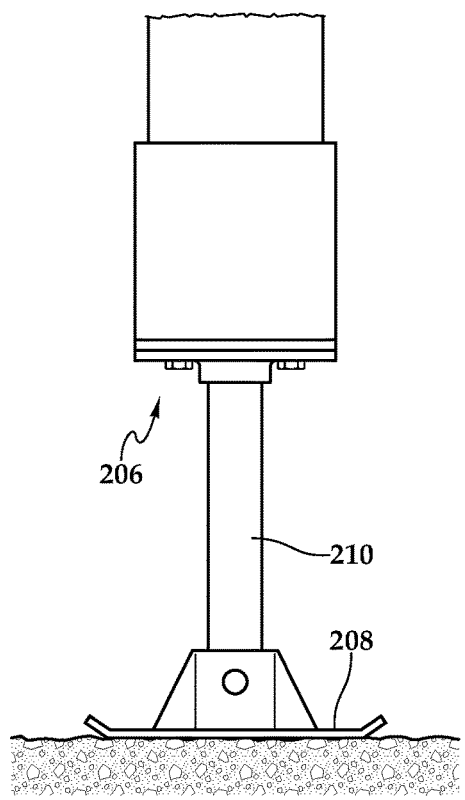
Figure 5C:
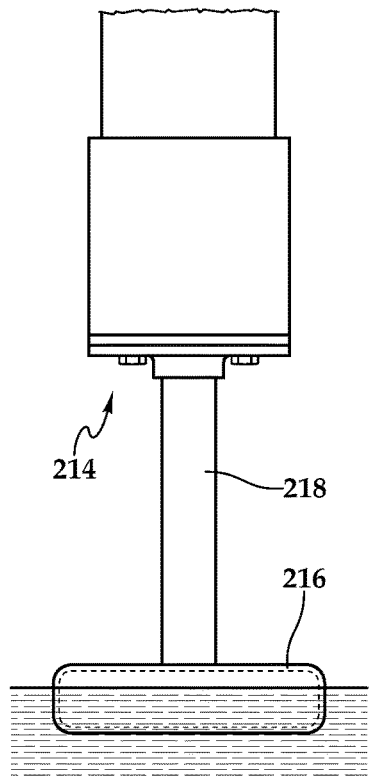
Figure 5D:
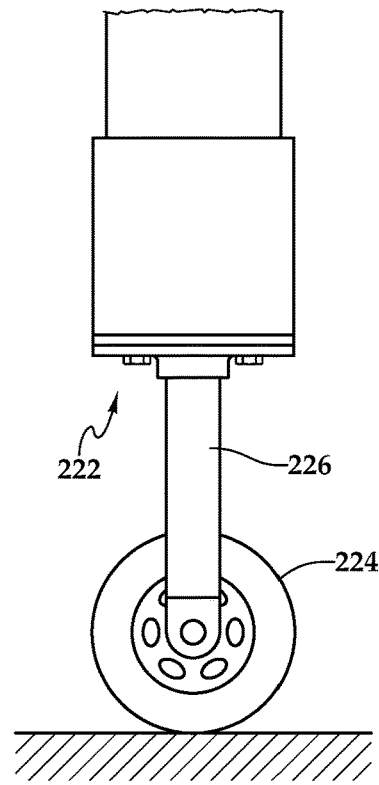

Referring to FIGS. 5A-5D in the drawings, different damping landing gear assemblies having various landing feet are schematically illustrated. In FIG. 5A, plunger 200 of damping landing gear assembly 202 does not have a landing foot. Indeed, the damping landing gear assemblies disclosed herein are not required to include a landing foot. Plunger 200 has a relatively sharp distal end that may be suitable for landing on hard surfaces such as concrete. In other embodiments, the distal end of plunger 200 may include a hard surface landing foot that is suitable for landing on such hard surfaces. In FIG. 5B, damping landing gear assembly 206 includes a soft surface landing foot 208 coupled to the distal end of plunger 210. Soft surface landing foot 208 has a large bottom surface area that may be suitable for landing on soft surfaces such as sand or gravel. In FIG. 5C, damping landing gear assembly 214 includes a water surface landing foot 216 coupled to the distal end of plunger 218. Water surface landing foot 216 is hollow such that water surface landing foot 216 is buoyant when submerged in water. Thus, water surface landing foot 216 may be suitable for aquatic landings of aircraft. In FIG. 5D, damping landing gear assembly 222 includes a wheel 224 coupled to the distal end of plunger 226. Wheel 224 may be suitable for use with damping landing gear assembly 222 when the aircraft is being transported along the ground or if a rolling landing is desired. The landing feet described in FIGS. 5A-5D, as well as others, may be interchangeable with one another to provide added versatility to the aircraft.

Figure 6:
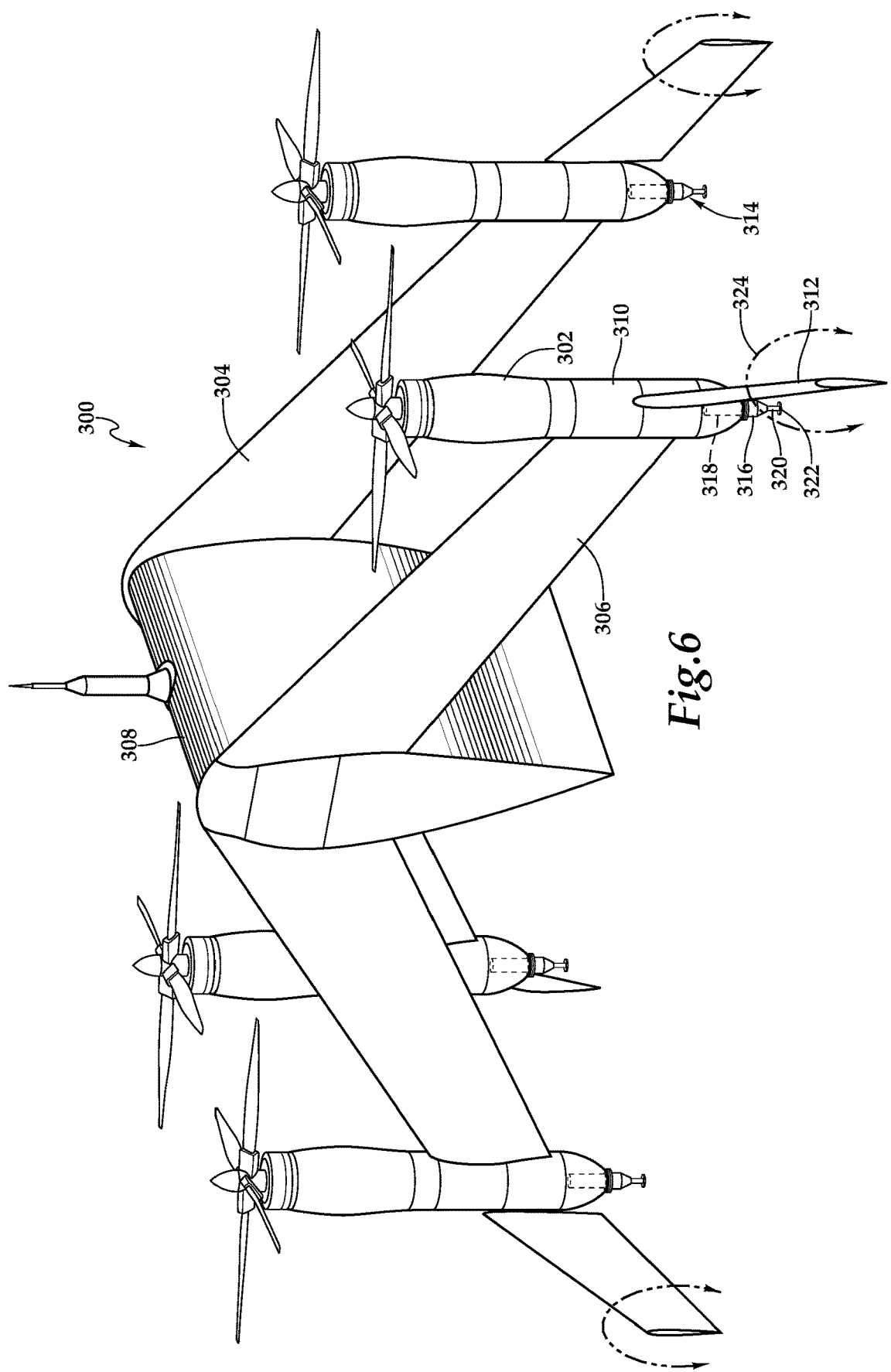
FIG. 6 is a schematic illustration of a VTOL aircraft having a damping landing gear system in accordance with embodiments of the present disclosure.

Referring to FIG. 6 in the drawings, a vertical takeoff and landing (VTOL) aircraft 300 operable to transition between thrust-borne lift in a VTOL orientation and wing-borne lift in a biplane orientation is schematically illustrated. FIG. 6 depicts VTOL aircraft 300 in the VTOL orientation wherein propulsion assemblies 302 provide thrust-borne lift. VTOL aircraft 300 may transition into a biplane orientation wherein propulsion assemblies 302 provide forward thrust with the forward airspeed of VTOL aircraft 300 providing wing-borne lift enabling VTOL aircraft 300 to have a high speed and/or high endurance forward flight mode, similar to VTOL aircraft 10 in FIG. 1B. VTOL aircraft 300 includes wings 304, 306 each having an airfoil cross-section that generates lift responsive to the forward airspeed of VTOL aircraft 300. Wings 304, 306 are coupled to opposing sides of fuselage 308 and have a swept-back design. VTOL aircraft 300 has a two-dimensional distributed thrust array that is coupled to wings 304, 306. More particularly, propulsion assemblies 302 including nacelles 310 are coupled to the outboard ends of wings 304, 306. Even though the illustrated embodiment depicts four propulsion assemblies, the distributed thrust array of VTOL aircraft 300 could have other numbers of propulsion assemblies both greater than or less than four. In the illustrated embodiment, propulsion assemblies 302 are variable speed propulsion assemblies having fixed pitch rotor blades and thrust vectoring capability. Depending upon the implementation, propulsion assemblies 302 may have longitudinal thrust vectoring capability, lateral thrust vectoring capability or omnidirectional thrust vectoring capability. In other embodiments, propulsion assemblies 302 may be single speed propulsion assemblies, may have variable pitch rotor blades and/or may be non-thrust vectoring propulsion assemblies. Coupled to the outboard sides of nacelles 310 are rotatable wing extensions 312. Rotatable wing extensions 312 are active and serve to manage the orientation of VTOL aircraft 300 as well as enhance hover stability in the VTOL orientation of VTOL aircraft 300. Fuselage 308, wings 304, 306 and/or propulsion assemblies 302 may include internal passageways operable to contain flight control systems, energy sources, communication lines and other desired systems.

VTOL aircraft 300 includes a damping landing gear system 314 having damping landing gear assemblies 316 coupled to the aft ends of nacelles 310. Each damping landing gear assembly 316 includes spring housing 318 forming a spring chamber in which a spring is disposed, a plunger 320 slidably coupled to spring housing 318 and landing foot 322 coupled to the distal end of plunger 320. When VTOL aircraft 300 lands, rotatable wing extensions 312 rotate as indicated by arrows 324 such that damping landing gear assemblies 316 are the bottom-most components of VTOL aircraft 300, allowing damping landing gear assemblies 316 to make initial contact with the landing surface. Indeed, damping landing gear assemblies 316 may be used in conjunction with a wide variety of aircraft, wing and wing extension designs.

Figure 7A:
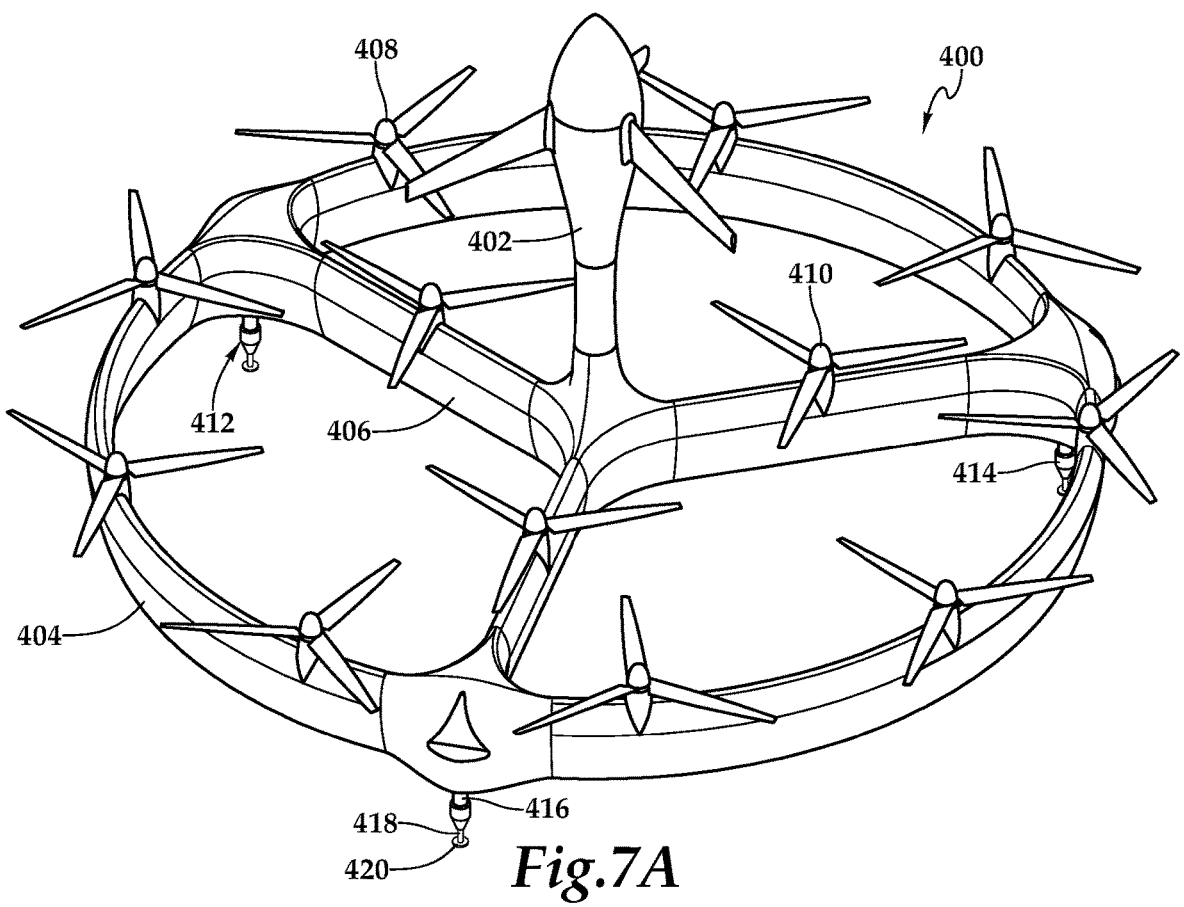
FIGS. 7A-7B are schematic illustrations of a closed wing aircraft having a damping landing gear system in accordance with embodiments of the present disclosure.
Figure 7B:
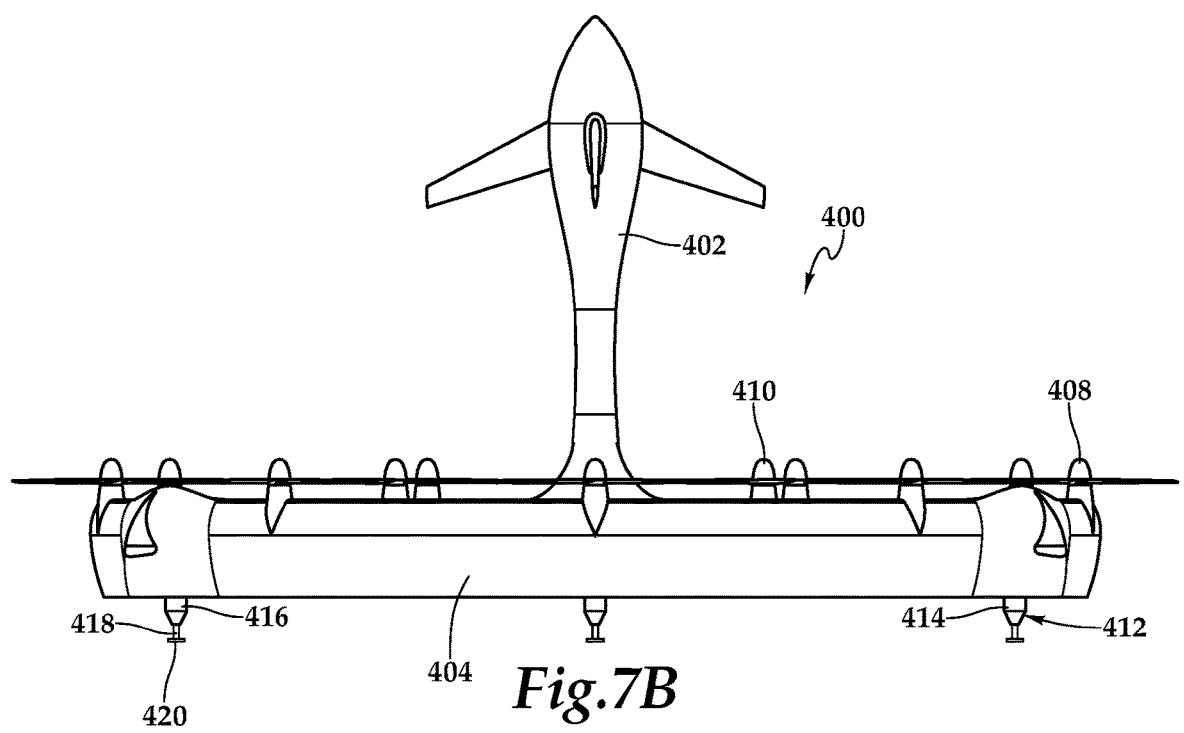

Referring to FIGS. 7A-7B in the drawings, a closed wing aircraft 400 including a fuselage 402 and a closed wing 404 supported by fuselage 402 is schematically illustrated. Closed wing 404 surrounds fuselage 402. Spokes 406 are interposed between fuselage 402 and closed wing 404. Closed wing aircraft 400 includes nine propulsion assemblies 408 coupled to closed wing 404 and three propulsion assemblies 410 coupled to spokes 406, although the number of propulsion assemblies may vary depending on the embodiment. Each propulsion assembly 408, 410 includes a motor and a proprotor assembly. Closed wing aircraft 400 is operable to transition between thrust-borne lift in a VTOL flight mode with closed wing 404 in a substantially horizontal orientation as shown in FIGS. 7A-7B and wing-borne lift in a forward flight mode with closed wing 404 in a substantially vertical orientation. Fuselage 402, closed wing 404 and/or spokes 406 may include internal passageways operable to contain flight control systems, energy sources, communication lines and other desired systems.

Closed wing aircraft 400 includes a damping landing gear system 412 having damping landing gear assemblies 414 coupled to the aft side of closed wing 404. Each damping landing gear assembly 414 includes spring housing 416 forming a spring chamber in which a spring is disposed, plunger 418 slidably coupled to spring housing 416 and landing foot 420 coupled to the distal end of plunger 418. When closed wing aircraft 400 lands while in the VTOL flight mode, damping landing gear assemblies 414 absorb at least a portion of the landing energy from the landing surface to smooth and stabilize the landing.

Referring to FIGS. 8A-8B in the drawings, a tail sitter aircraft is schematically illustrated and generally designated 500. Tail sitter aircraft 500 includes fuselage 502, wings 504, 506, 508 and a tailboom assembly 510. As illustrated, wings 504, 506, 508 are forward of tailboom assembly 510 during forward flight and are considered to be supported by a forward portion of fuselage 502 while tailboom assembly 510 extends from an aft portion of fuselage 502. Preferably, wings 504, 506, 508 each have an airfoil cross-section operable to generate lift responsive to the forward airspeed of tail sitter aircraft 500 and form the main lifting surface of tail sitter aircraft 500. Tail sitter aircraft 500 has a propulsion system depicted as a distributed propulsion system 512 including a plurality of propulsion assemblies in the form of proprotors. Fuselage 502 and wings 504, 506, 508 may include internal passageways operable to contain flight control systems, energy sources, communication lines and other desired systems.

Tailboom assembly 510 includes a plurality of tail arms 514, 516, 518 that are operable to be radially retracted in forward flight, as best seen in FIG. 8A, forming a small tail surface geometry wherein control surfaces 520 provide yaw and pitch control. In addition, tail arms 514, 516, 518 are operable to be radially extended for landing, as best seen in FIG. 8B, forming a stable ground contact base. Each tail arm 514, 516, 518 includes one of control surfaces 520. The distal ends of tail arms 514, 516, 518 include damping landing gear assemblies 522 forming damping landing gear system 524. Each damping landing gear assembly 522 includes spring housing 526 forming a spring chamber in which a spring is disposed, plunger 528 slidably coupled to spring housing 526 and landing foot 530 coupled to the distal end of plunger 528. When tail sitter aircraft 500 lands while in a VTOL orientation and tail arms 514, 516, 518 are radially extended as shown in FIG. 8B, damping landing gear assemblies 522 absorb at least a portion of the landing energy from the landing surface to smooth and stabilize the landing.

Referring to FIGS. 9A-9B in the drawings, a helicopter is schematically illustrated and generally designated 600. The primary propulsion assembly of helicopter 600 is a main rotor assembly 602 powered by an engine via a main rotor gearbox. Main rotor assembly 602 includes a plurality of rotor blade assemblies 604 extending radially outward from a main rotor hub 606. Main rotor assembly 602 is coupled to a fuselage 608. Main rotor hub 606 is rotatable relative to fuselage 608. The pitch of rotor blade assemblies 604 can be collectively and/or cyclically manipulated to selectively control direction, thrust and lift of helicopter 600. A tailboom 610 extends from fuselage 608 in the aft direction. An anti-torque system 612 includes a tail rotor 614 that is rotatably coupled to the aft portion of tailboom 610. Anti-torque system 612 controls the yaw of helicopter 600.

Helicopter 600 includes a damping landing gear system 616 having damping landing gear assemblies 618 coupled to the bottom of fuselage 608. Each damping landing gear assembly 618 includes spring housing 620 forming a spring chamber in which a spring is disposed and plunger 622 slidably coupled to spring housing 620. Left landing skid 624 is coupled to the distal ends of the plungers of the left damping landing gear assemblies 618 and right landing skid 626 is coupled to the distal ends of the plungers of the right damping landing gear assemblies 618. Thus, the landing feet of damping landing gear system 616 interconnect damping landing gear assemblies 618 to provide larger landing surfaces. When helicopter 600 lands, damping landing gear assemblies 618 absorb at least a portion of the landing energy from the landing surface to smooth and stabilize the landing.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A vertical takeoff and landing aircraft propulsion assembly comprising:
   a damping landing gear assembly comprising:
   a spring housing disposed inside the vertical takeoff and landing aircraft propulsion assembly, the spring housing forming a spring chamber;
   a spring disposed in the spring chamber; and
   a plunger slidably coupled to the spring housing and movable between a plurality of positions including a compressed position and an extended position;
   wherein the spring biases the plunger into the extended position during flight; and
   wherein the vertical takeoff and landing aircraft propulsion assembly experiences a landing force during landing, the landing force compressing the plunger into the compressed position against the bias of the spring, thereby absorbing at least a portion of the landing force.

2. The vertical takeoff and landing aircraft propulsion assembly as recited in claim 1 wherein the damping landing gear assembly further comprises a flange coupled to a distal end of the spring housing;
   wherein the vertical takeoff and landing aircraft propulsion assembly comprises an airframe portion; and
   wherein the flange is coupled to the airframe portion.

3. The vertical takeoff and landing aircraft propulsion assembly as recited in claim 1 wherein the spring chamber further comprises a cylindrical spring chamber.

4. The vertical takeoff and landing aircraft propulsion assembly as recited in claim 1 wherein the spring is disposed between the plunger and a proximal end of the spring housing.

5. The vertical takeoff and landing aircraft propulsion assembly as recited in claim 1 wherein the vertical takeoff and landing aircraft propulsion assembly is configured to take off and land on a landing surface, the spring biasing the plunger against the landing surface during takeoff to generate a push-off effect.

6. The vertical takeoff and landing aircraft propulsion assembly as recited in claim 1 wherein the spring further comprises a compression spring.

7. The vertical takeoff and landing aircraft propulsion assembly as recited in claim 1 wherein the spring further comprises a friction spring.

8. The vertical takeoff and landing aircraft propulsion assembly as recited in claim 1 wherein the spring further comprises a viscous spring.

9. The vertical takeoff and landing aircraft propulsion assembly as recited in claim 1 wherein the spring further comprises a solid packing material.

10. The vertical takeoff and landing aircraft propulsion assembly as recited in claim 1 wherein the spring further comprises a gas spring.

11. The vertical takeoff and landing aircraft propulsion assembly as recited in claim 10 wherein the spring housing forms an orifice.

12. The vertical takeoff and landing aircraft propulsion assembly as recited in claim 10 wherein the damping landing gear assembly further comprises an adjustable orifice coupled to a proximal end of the spring housing.

13. The vertical takeoff and landing aircraft propulsion assembly as recited in claim 1 wherein the plunger has a proximal end forming a piston disposed in the spring chamber.

14. The vertical takeoff and landing aircraft propulsion assembly as recited in claim 13 wherein the piston forms a piston cavity configured to receive the spring.

15. The vertical takeoff and landing aircraft propulsion assembly as recited in claim 1 wherein the damping landing gear assembly further comprises a landing foot coupled to a distal end of the plunger.

16. The vertical takeoff and landing aircraft propulsion assembly as recited in claim 15 wherein the landing foot further comprises one of a hard surface landing foot, a soft surface landing foot or a water surface landing foot.

17. A vertical takeoff and landing aircraft comprising:
a fuselage;
a propulsion assembly; and
a damping landing gear assembly coupled to the propulsion assembly, the damping landing gear assembly comprising:
a spring housing disposed inside the propulsion assembly, the spring housing forming a spring chamber;
a spring disposed in the spring chamber; and
a plunger slidably coupled to the spring housing and movable between a plurality of positions including a compressed position and an extended position;
wherein the spring biases the plunger into the extended position during flight; and
wherein the vertical takeoff and landing aircraft experiences a landing force during landing, the landing force compressing the plunger into the compressed position against the bias of the spring, thereby absorbing at least a portion of the landing force.

18. The vertical takeoff and landing aircraft as recited in claim 17 further comprising:
an airframe having first and second wings with first and second pylons extending therebetween, the fuselage coupled to the pylons; and
a two-dimensional distributed thrust array including the propulsion assembly attached to the airframe, the thrust array including a plurality of propulsion assemblies coupled to the first wing and a plurality of propulsion assemblies coupled to the second wing;
wherein the damping landing gear assembly further comprises a plurality of damping landing gear assemblies, each damping landing gear assembly coupled to an aft end of a respective one of the propulsion assemblies.

19. The vertical takeoff and landing aircraft propulsion assembly as recited in claim 1 wherein the vertical takeoff and landing aircraft propulsion assembly comprises a nacelle, the spring housing disposed inside the nacelle.

20. The vertical takeoff and landing aircraft propulsion assembly as recited in claim 1 further comprising a plurality of landing feet including a hard surface landing foot and a soft surface landing foot interchangeably attachable to a distal end of the plunger.

* * * * *